Dec. 13, 1960 W. NICHOLAS 2,964,106
PROJECTION SCREEN
Filed Aug. 27, 1957 2 Sheets-Sheet 1
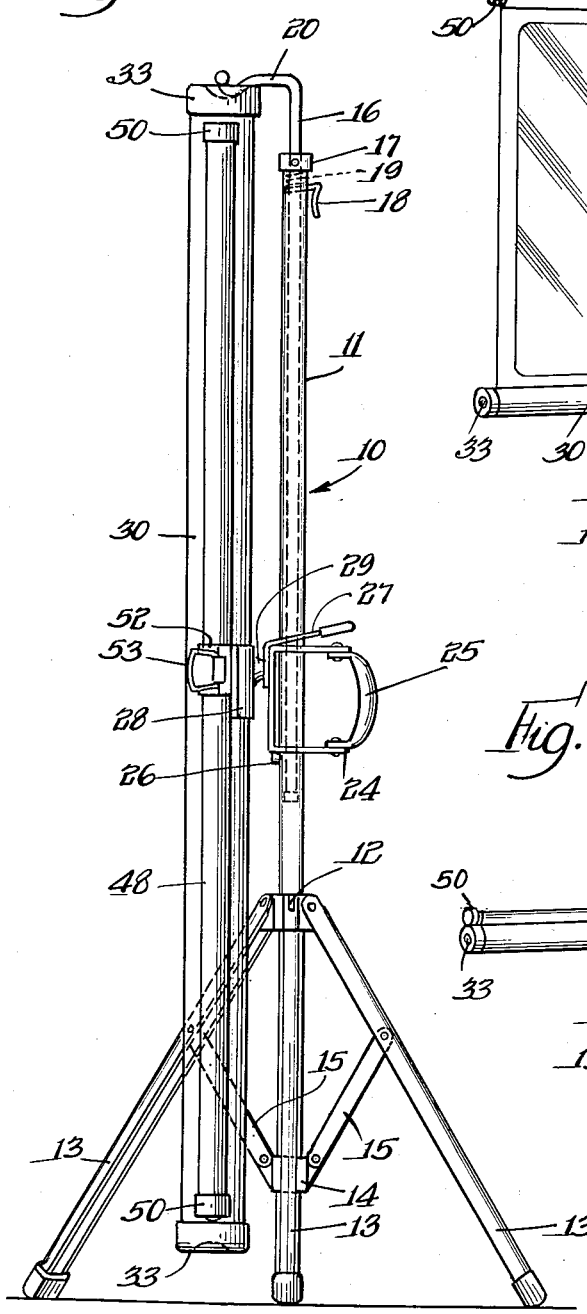
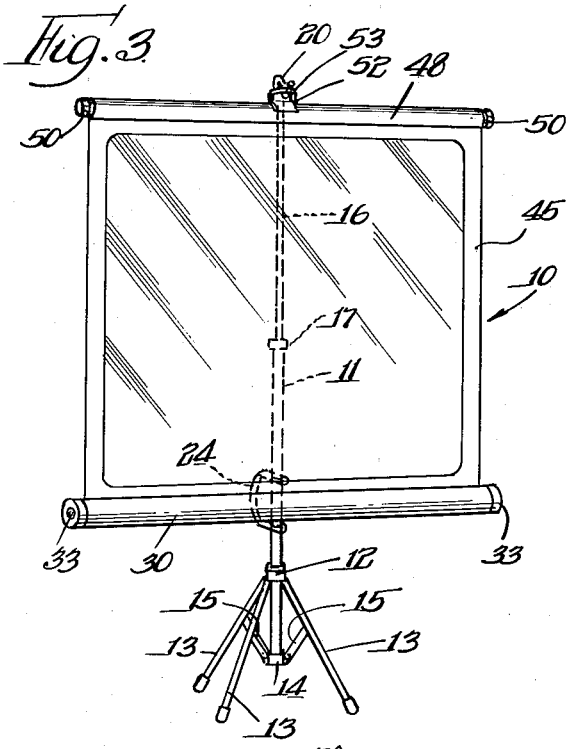
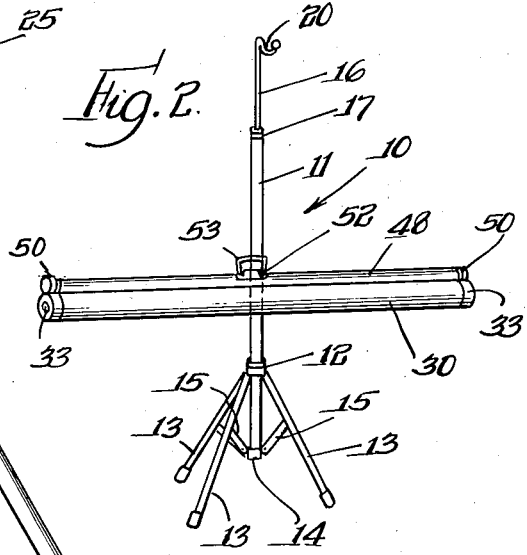
INVENTOR.
William Nicholas
BY
Wallenstein + Spangenberg
attys.

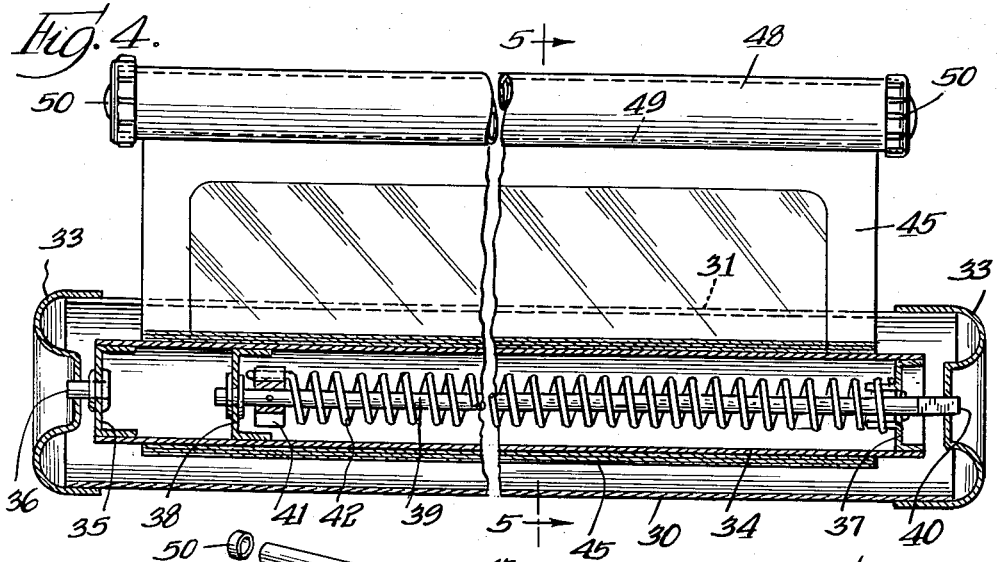

United States Patent Office 2,964,106
Patented Dec. 13, 1960

2,964,106

PROJECTION SCREEN

William Nicholas, Evanston, Ill., assignor to Radiant Manufacturing Corporation, Chicago, Ill., a corporation of Illinois Filed Aug. 27, 1957, Ser. No. 680,451

1 Claim. (Cl. 160—24)

This invention relates to projection screens for use in exhibiting pictures projected thereon.

The principal object of this invention is to provide an improved suspension slat for the outer end of a flexible screen of a projection screen of the type having a screen case and a spring actuated roller mounted in the screen case to which the inner end of the flexible screen is secured so as to be automatically rolled thereon. The improved suspension slat, which is utilized for unrolling the screen from the roller to picture exhibiting position, is strong and rugged in construction, is firmly secured to the flexible screen in an effective but yet inexpensive manner, interiorly contains the outer end of the flexible screen to prevent damage thereto, encloses and hides the flexible screen in the screen case when the flexible screen is rolled upon the roller, and enhances the appearance of the projection screen.

Further objects of this invention reside in the details of construction of the improved projection screen and in the cooperative relationships between the component parts thereof.

Other objects and advantages of this invention will become apparent to those skilled in the art upon reference to the accompanying specification, claims and drawings in which:

Fig. 1 is a side elevational view of the projection screen of this invention with the legs of the supporting stand extended and with the screen case vertically arranged;

Fig. 2 is a perspective view of the projection screen with the screen case horizontally arranged and with the flexible screen retracted into the screen case;

Fig. 3 is a view similar to Fig. 2 but illustrating the flexible screen extended to picture exhibiting position;

Fig. 4 is a vertical sectional view through the screen case and illustrating the flexible screen partially extended;

Fig. 5 is a vertical sectional view taken substantially along the line 5—5 of Fig. 4;

Fig. 6 is an exploded perspective view illustrating the construction of the suspension slat;

Fig. 7 is a vertical sectional view through a portion of the suspension slat; and Fig. 8 is a vertical sectional view taken substantially along the line 8—8 of Fig. 7.

Referring first to Figs. 1 to 3, the projection screen of this invention is generally designated at 10. It comprises a portable collapsible stand having an upright tube or post 11, which is preferably non-circular in cross-section. A bracket 12 is slidably carried on the upright tube 11 and a plurality of legs 13 are pivotally secured to the bracket 12. Fixed to the bottom of the upright tube 11 is a bracket 14 and links 15 are pivotally secured to the bracket 14 and to the legs 13. The legs 13 may be folded together for transportation purposes and when this is done, the bracket 12 slides upwardly on the tube or post 11. Suitable latch means (not shown) may be provided for holding the legs 13 in collapsed position. When the legs are extended for exhibiting purposes, as illustrated, the bracket 12 slides downwardly on the upright post 11. In this way the supporting stand is maintained in an upright position.

An extension rod 16 is slidably mounted in the upright tube or post 11, the extension rod being guided for vertical movement by a collar carried on the lower end of the extension rod and by a collar 17 secured to the upper end of the post 11. The extension rod 16 is maintained in any desired extended position by a nipping lever 18 extending through a suitable opening in the upright tube 11 and gripping the extension rod 16. The nipping lever 18 is resiliently urged into gripping position by means of a spring 19 and the action of the spring may be overcome by manually manipulating the nipping lever 18 to allow desired adjustment of the position of the extension rod 16. The upper end of the extension rod 16 is provided with a hook portion 20. There is thus provided a hook member which is slidably and adjustably carried by the post. A handle member 24 having a handle portion 25 is slidably carried on the upright tube or post 11. Downward movement of the handle 24 is limited by a pin 26 carried by the post 11. A resilient nipping lever 27 is carried by the handle lever 24 and operates to grip the post 11 for maintaining the handle member in any desired position above the pin 26. By manipulating this nipping lever 27 the handle member 24 may be adjustably positioned along the post 11. A bracket 28 is pivotally mounted on the handle member 24 as indicated at 29 and this bracket member 28 carries a screen case 30 which, as illustrated, may be substantially circular in cross section.

The screen case 30 is provided with a screen accommodating opening 31 extending throughout its length. The screen case 31 is provided with end brackets or caps 33. At least one of these end caps is provided with a depression for receiving the hook portion 20 for locking the screen case in paralleled relation to the post 11, as illustrated in Fig. 1. A spring actuated roller 34 is mounted within the screen case 30. Here the roller 34 is illustrated as being a tubular metallic roller which is provided with end spiders 35 and 37 and an intermediate spider 38. One end spider 35 carries a pin 36 which is rotatably mounted in a hole in the associated end cap 33 for rotatably mounting that end of the roller 34. The other end spider 37 and the intermediate spider 38 rotatably carry a shaft 39, the outer end of the shaft 39 being flattened, as indicated at 40, and received in a correspondingly shaped hole in the associated end cap 33. Thus the rod 39 is supported by and held against rotation by the end cap 33, the roller 34 rotating upon the shaft 39. A collar 41 is secured to the shaft 39 adjacent the intermediate spider 38, and one end of a coil spring 42 is secured to the collar 41, the other end of the coil spring 42 being secured to the end spider 37. The coil spring 42 operates to rotate the roller 34 in a rolling direction.

The inner end of the flexible projection screen 45 is secured to the roller 34 within the screen case 30 and the coil spring 42 operates automatically to roll the screen 45 on the roller 34. The flexible screen 45 may be provided with any suitably picture projecting surface, such as a beaded surface where motion pictures are to be exhibited, or an aluminum type surface where color pictures are to be exhibited.

A suspension slat is carried by the outer end of the flexible screen for the purpose of unrolling the screen from the roller to picture exhibiting position. In this latter respect a retaining member is secured to the outer end of the screen, this retaining member comprising a pair of elongated strips 46 of cardboard or the like, which are secured on opposite sides of the flexible screen in any suitable manner, as by sewing or stapling as indicated at 47. These elongated strips, forming the retaining member, extend throughout the length of the outer end of the flexible screen 45. A tubular member 48, which may be formed from metal or the like and which is of greater length than the width of the projection screen, is provided with a slot 49 extending throughout its length. This slot 49 is of less width than the width of the retaining member formed by the strips 46. The outer end of the screen 45 and the retaining member 46 are longitudinally received within the tubular member 48 from one end thereof and they engage the interior of the tubular member 48 adjacent the slot 49 to be retained thereby with the screen extending through the slot. A cap 50 is secured to each end of the tubular member 48 to prevent longitudinal displacement of the screen and retaining member with respect to the tubular member. The caps 50 may be formed of any suitable material, such as a synthetic plastic material, and may be friction held in place on the tubular member.

By reason of this construction the tubular member 48, forming the suspension slat, is firmly secured to the flexible screen 45 in an effective but yet inexpensive manner, and provides a strong and rugged construction. The outer end of the flexible screen 45 is interiorally contained in the tubular member 48 so as to be protected thereby and so as to prevent damage thereto. When the flexible screen 45 is rolled upon the roller 34 in the screen case 30 the tubular member 48 hides the flexible screen and substantially closes the screen accommodating opening 31 in the screen case 30. This also protects the flexible screen and prevents dirt from accumulating thereon when the projection screen is not in use and stored away.

A bracket 52 is secured to the center of the tubular member 48 and this bracket 52 carries a bail 53 which is utilized for withdrawing the flexible screen 45 from the screen case 30 and which is hooked over the hook member 20 for holding the flexible screen 45 in picture exhibiting position as illustrated in Fig. 3.

While for purposes of illustration one form of this invention has been disclosed, other forms thereof may become apparent to those skilled in the art upon reference to this disclosure and, therefore, this invention is to be limited only by the scope of the appended claim.

I claim as my invention:

In a projection screen for exhibiting pictures projected thereon and having a supporting stand, a screen case carried by the supporting stand, a spring actuated roller mounted in the screen case, a flexible screen secured at its inner end to the roller and being automatically rollable thereon, and a hook member carried by the supporting stand, the improvement comprising, a pair of elongated strips secured to the outer end of the screen on opposite sides thereof and extending throughout the length thereof and forming a retaining member therefor, a hollow tubular member of greater length than the width of the screen and having a narrow slot throughout the length thereof which is of less width than the width of the retaining member, the outer end of the screen and the retaining member being longitudinally wholly received within the hollow tubular member from one end thereof with the edges of the strips adjacent the screen engaging the tubular member adjacent the slot to be retained thereby with the screen extending through the slot, a cap secured in surrounding relation to each end of the tubular member and extending inwardly to adjacent the ends of the retaining member to prevent longitudinal displacement of the screen and retaining member with respect to the tubular member, the tubular member forming a suspension slat for the screen for unrolling the screen from the roller, and a bail carried by the tubular member and adapted to be received over the hook member for securing the screen in picture exhibiting position.

References Cited in the file of this patent

UNITED STATES PATENTS

| | | |
|---|---|---|
| 286,027 | Lobdell | Oct. 2, 1883 |
| 1,901,073 | Bailey | Mar. 14, 1933 |
| 2,382,025 | Raven | Aug. 14, 1945 |
| 2,696,249 | Prokop et al. | Dec. 7, 1954 |